US012236807B2

(12) United States Patent
Murray

(10) Patent No.: US 12,236,807 B2
(45) Date of Patent: Feb. 25, 2025

(54) NONDESTRUCTIVE WALL MOUNTABLE SILICONE EDGE GRAPHIC

(71) Applicant: Super Color Digital, LLC, Irvine, CA (US)

(72) Inventor: Scott V. Murray, Mission Viejo, CA (US)

(73) Assignee: Super Color Digital, LLC, Irvine, CA (US)

( * ) Notice: Subject to any disclaimer, the term of this patent is extended or adjusted under 35 U.S.C. 154(b) by 0 days.

(21) Appl. No.: 16/566,620

(22) Filed: Sep. 10, 2019

(65) Prior Publication Data

US 2021/0074190 A1 Mar. 11, 2021

(51) Int. Cl.

*G09F 7/04* (2006.01)
*G09F 13/04* (2006.01)
*A47G 1/17* (2006.01)

(52) U.S. Cl.

CPC ...... *G09F 13/0413* (2013.01); *G09F 13/0445* (2021.05); *A47G 1/17* (2013.01); *G09F 7/04* (2013.01)

(58) Field of Classification Search

CPC .... G09F 13/0413; G09F 13/0445; G09F 7/04; G09F 2013/0445; A47G 1/06; A47G 1/0605; A47G 1/0633; A47G 2001/0672; A47G 1/17

See application file for complete search history.

(56) References Cited

U.S. PATENT DOCUMENTS

| | | | | |
|---|---|---|---|---|
| 3,877,165 A * | 4/1975 | Lumbard | G09F 1/12 | 40/757 |
| 4,024,659 A * | 5/1977 | Ingerdahl | G09F 1/12 | 52/656.1 |
| 4,261,122 A * | 4/1981 | LeVine | G09F 1/12 | 248/551 |
| 4,629,075 A * | 12/1986 | Hutten | A47G 1/21 | 211/45 |
| 4,912,864 A * | 4/1990 | Price | G09F 1/12 | 40/711 |
| 9,858,836 B2 * | 1/2018 | Weight | G09F 15/0025 | |
| 2014/0202054 A1 * | 7/2014 | Valentine | G09F 15/0068 | 29/428 |

* cited by examiner

*Primary Examiner* — Cassandra Davis
(74) *Attorney, Agent, or Firm* — DANE IP Law PC

(57) ABSTRACT

A silicone edge graphic that is magnetically mountable to a wall is disclosed. No mechanical fasteners or adhesives are used to mount the silicone edge graphic to the wall. The back surface of the silicone edge graphic may have a non-marring configuration, so that the silicone edge graphic does not damage the wall. Additionally, a frame of the silicone edge graphic may be flexible enough to allow the user to remove the silicone edge graphic by peeling the silicone edge graphic off of the wall starting from one peripheral section or corner then progressive to the rest of the periphery. The magnets may also be positioned to reduce a force required to lift the section or corner of the silicone edge graphic off of the wall to begin peeling the silicon edge graphic off of the wall.

15 Claims, 8 Drawing Sheets

NONDESTRUCTIVE WALL MOUNTABLE SILICONE EDGE GRAPHIC

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to a silicone edge graphic, which can be mounted to a surface without damaging the surface and without use of mechanical destructive attachment devices (e.g., screws, nails) or adhesives.

Companies rent space in convention halls and hotel meeting areas for various purposes. By way of example and not limitation, companies may hold a trade show or other type of promotional event at the convention center or hotel. In doing so, companies would like to personalize the space in order to maximize advertisements, messaging and other information to be conveyed to the attendees of the meeting. Unfortunately, convention centers and hotels do not allow companies to mount things onto the air walls because of the damage it does to the air walls.

Accordingly, there is a need in the art for ways to provide informational materials on air walls to attendees who attend these conventions and hotels.

BRIEF SUMMARY

The various aspects and embodiments discussed herein relate to a silicone edge graphic that is mountable to an air wall. The silicon edge graphic does not damage the surface of the air wall to which the silicone edge graphic is mounted to. To this end, the silicone edge graphic may be embedded with a plurality of magnets that is attracted to a metal backing of the air wall. Moreover, a back surface of the silicone edge graphic, which contacts the front surface of the air wall may be configured so as to be non-marring. For example, the back surface my be smooth, and its edges may be radiused to prevent any damage to the front surface of the air wall when the back surface touches or contacts the front surface of the air wall when mounted. No mechanical fastener is used that may penetrate or adhere to the air wall for mounting the silicon edge graphic. To remove the silicone edge graphic from the wall, the silicone edge graphic may be peeled away by pulling up on a frame member of the silicone edge graphic, then removing the remainder of the silicone edge graphic off of the wall. When peeling the silicone edge graphic off of the wall, the user can start at one corner of the silicone edge graphic such as where two frame members are attached to each other and lift up. Because the magnets may be embedded in only the frame members or the periphery of the silicone edge graphic, the user may start to lift the silicone edge graphic from one corner then progressively lift up the rest of the silicone edge graphic off of the wall.

More particularly, a silicon edge graphic mountable to a wall without damaging a front surface of the wall is disclosed. The silicon edge graphic may comprise a plurality of frame members, a plurality of magnets, a plurality of angled brackets and a fabric.

The plurality of frame members may be extruded aluminum. The frame members may have a first slot and a second slot. The first and second slots may extend through an entire length of the frame member. The first and second slots may have a width that is smaller than a height. A direction of the height of the first slot may be perpendicular to a direction of the height of the second slot. The direction of the height of the second slot may be parallel to a back surface of the frame member. The entire length of each of the frame members may be greater than 2 feet.

The plurality of magnets may be disposed within the second slot of at least one frame member. The plurality of angled brackets may each be insertable into the second slots of immediately adjacent frame members for connecting the immediately adjacent frame members to each other at an angle of the bracket.

The fabric may have indicia printed thereon. An outer peripheral portion of the fabric may have a shape coinciding with the plurality of frame members. An edge portion of the fabric may have silicon attached thereto. The silicon may be disposed within the first slots of the frame members.

The magnets may be spread apart about 1 inch to 12 inches from each other in the second slots. A distal six inches of the frame members may be devoid of any magnet. Set screws may be threaded into threaded holes of the magnets for locking a position of the magnet within the second slots and along the length of the frame member so that the magnets do not slide into the distal six inches of the frame members such as by way of vibration or movement of the silicone edge graphic. The magnets may be disposed in an upper most frame member of the plurality of frame members. It is also contemplated that the magnets may be disposed only in the upper most frame member of the plurality of frame members.

Inner and outer edges of the back surface of the frame members may have a radius greater than 1/16 of an inch. A felt material may be attached to the back surface of the frame member to mitigate marring of a front surface of the wall when the silicone edge graphic is mounted to the wall.

An exterior side surface of the frame member may have a roughened surface for assisting a user to lift up on the frame member to remove (e.g., peel) the silicone edge graphic off of or from the wall. The exterior side surface of the frame member may have a convex configuration along its length to aid the user in lifting up the frame member off of the wall. The convex configuration provides a depression where the user can insert his or her finger.

The exterior side surface of the frame member may have an acute angle with respect to a plane of the back surface of the frame member. In this manner, the acute angled exterior side surface provides additional force for the user to lift up on the frame member.

The frame member may have a thickness of about 1 inch so that it can bend to allow the user to peel the silicone edge graphic off of the wall.

In another aspect, a method of removing a silicone edge graphic from a wall is disclosed. The method may comprise the steps of providing a silicone edge graphic attached to the wall with a magnet; pushing against an exterior surface of a frame member of the silicone edge graphic; lifting the frame member; and peeling the silicone edge graphic off of the wall.

In the method, the pushing step may be performed at a distal six inches of the frame member where the frame member is devoid of any magnet.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 5:
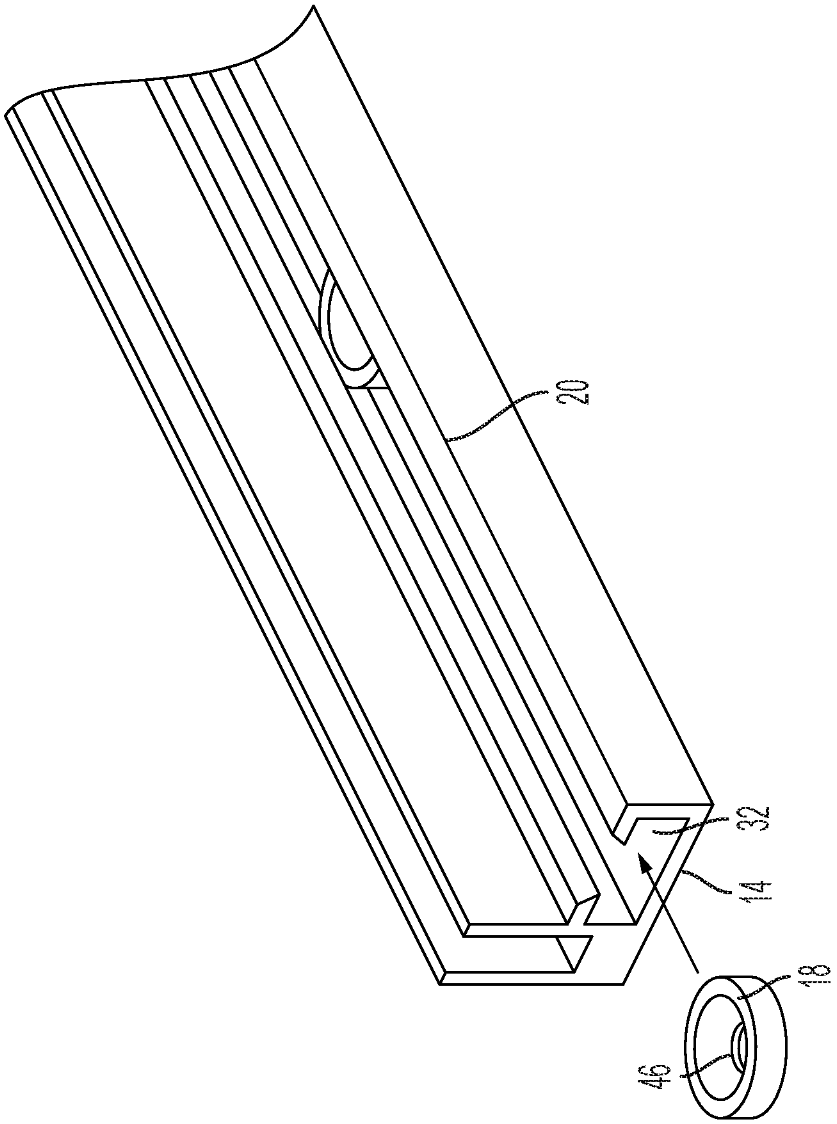
FIG. 5 is a perspective view of a magnet being slid into a slot of a frame member.
Figure 6A:
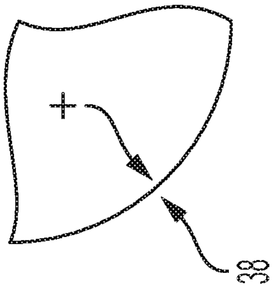
FIG. 6A is an enlarged view of the silicone edge graphic shown in FIG. 6.
Figure 6B:
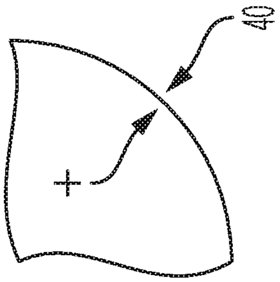
FIG. 6B is an enlarged view of the silicone edge graphic shown in FIG. 6.
Figure 6:
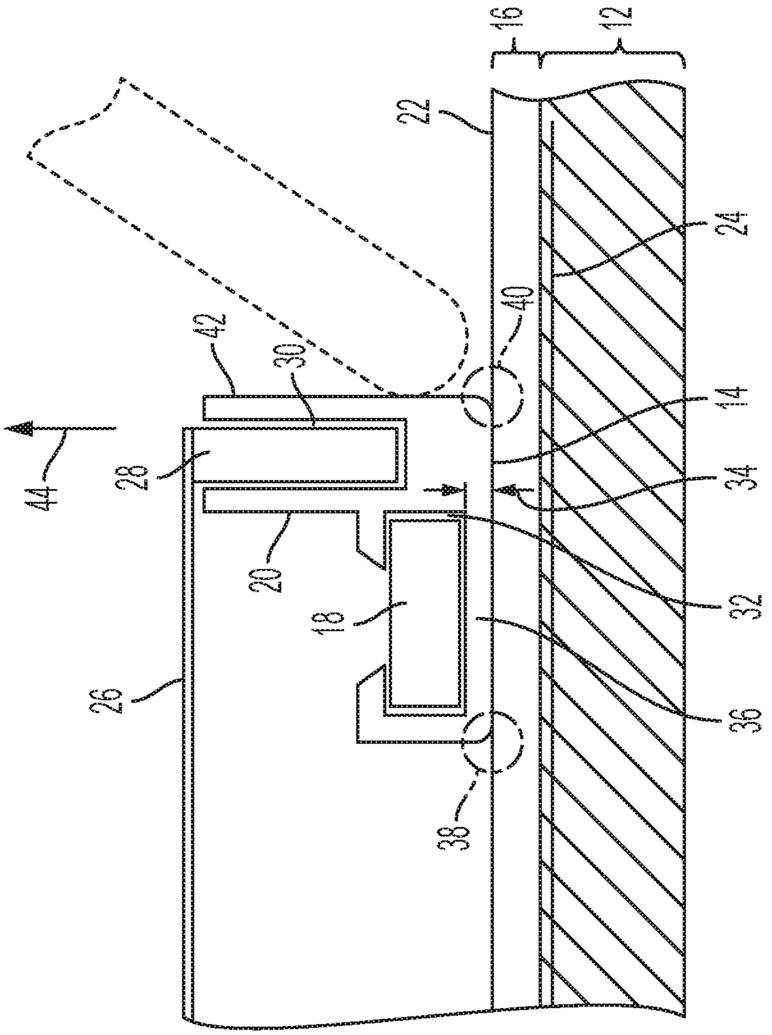
FIG. 6 is a cross-sectional view of the air-wall and the silicone edge graphic shown in FIG. 1.

Referring now to the drawings, a silicone edge graphic 10 magnetically mountable to an air wall 12 is shown. The silicone edge graphic 10 may have a smooth back surface 14 (FIG. 5) that contacts a fabric 16 or other front surface 22 of the air wall 12 (FIG. 6) so that the silicone edge graphic 10 does not mar or damage the fabric 16 of the air wall 12 when the silicone edge graphic 10 is mounted to the wall 12. The silicone edge graphic 10 may be mounted to the wall 12 with magnets 18 that may be embedded within frame numbers 20, as shown in FIG. 6. The frame (i.e., attached frame members 20) of the silicone edge graphic 10 may be flexible enough to allow the user to remove the silicone edge graphic 10 off of a wall by lifting one corner or section of the silicone edge graphic 10 off of the wall first then peel the rest of the silicone edge graphic 10 off of the wall.

Figure 1:
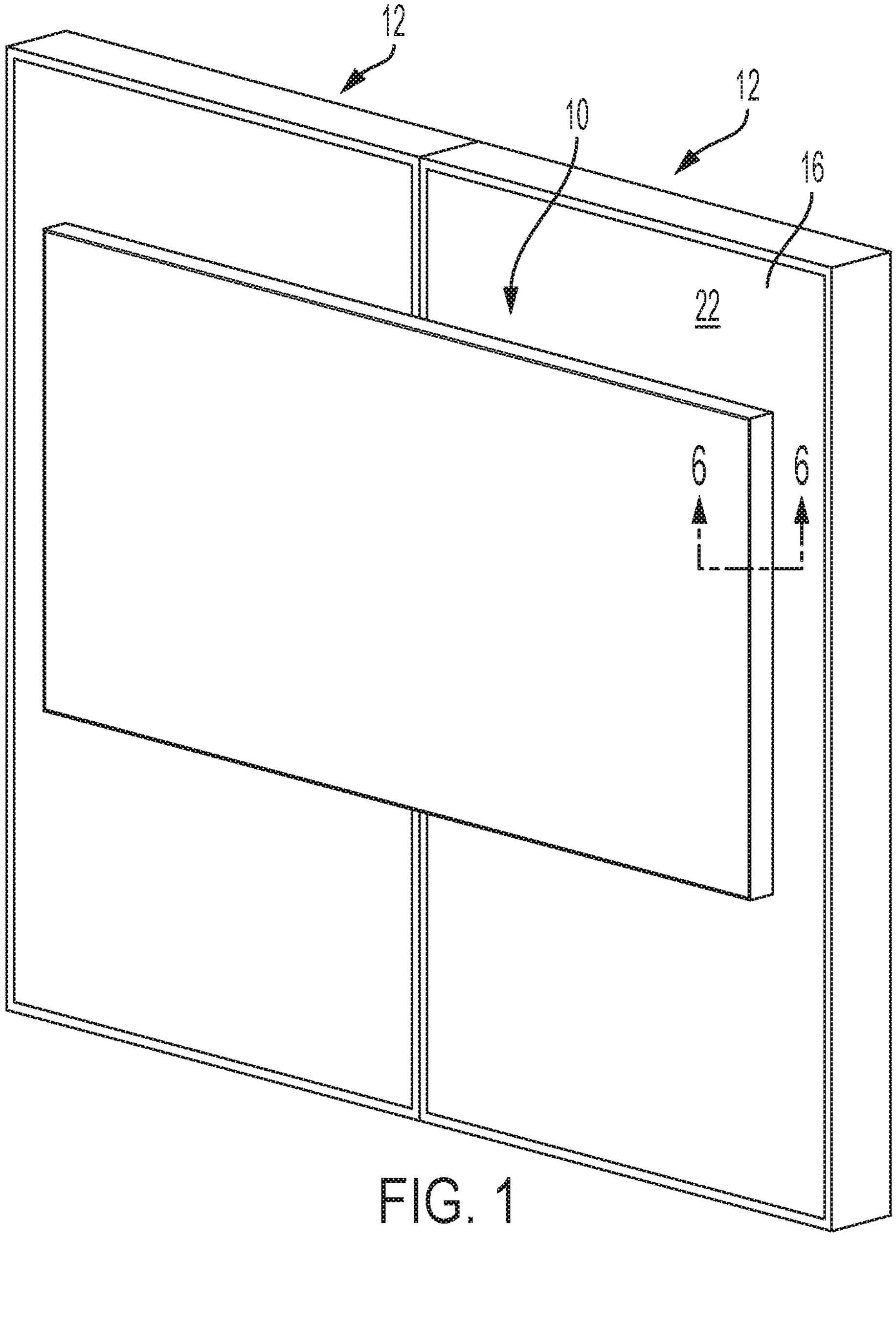
FIG. 1 is a perspective view of a silicone edge graphic magnetically mounted to air walls.
Figure 2:
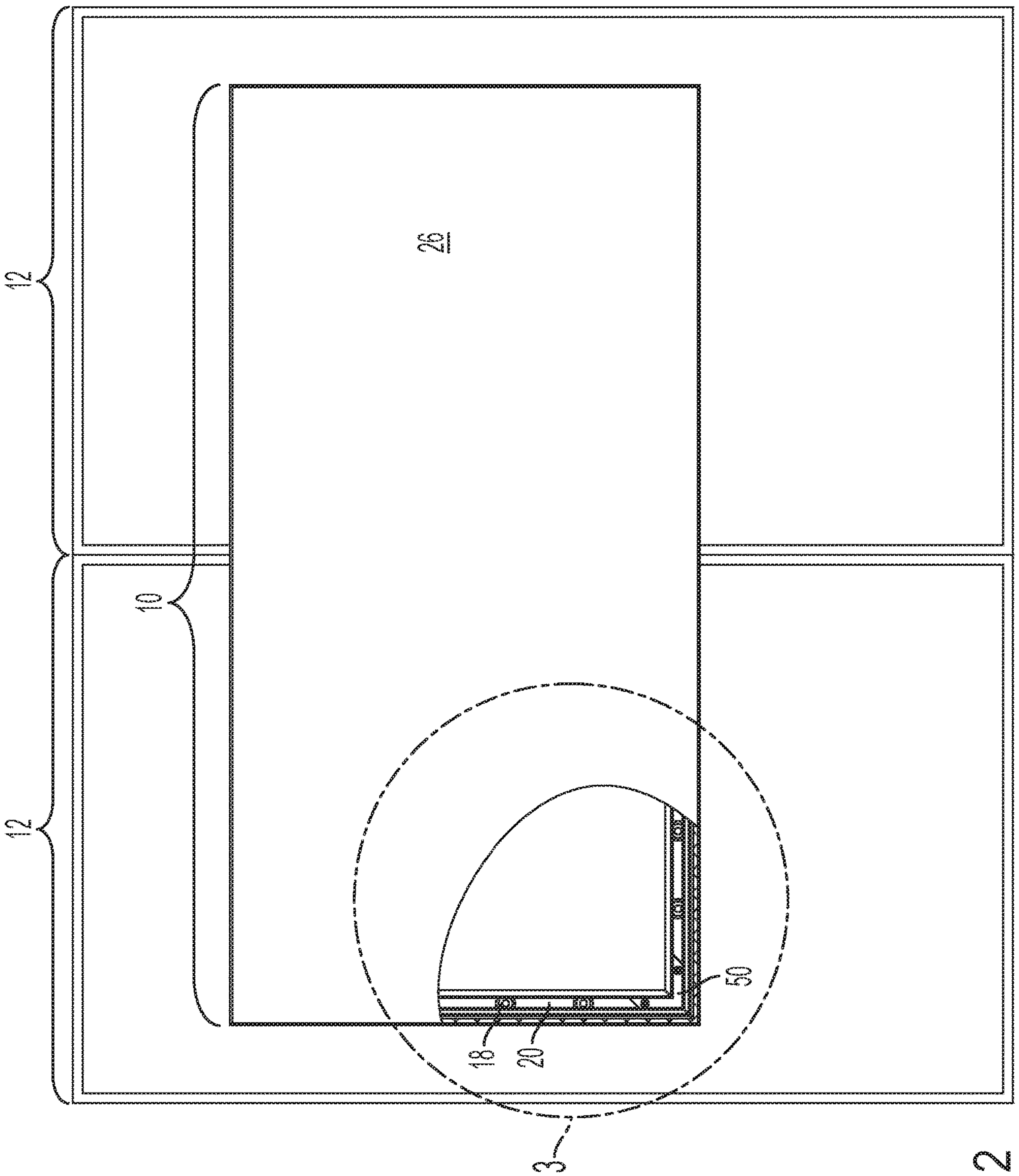
FIG. 2 is a front view of the silicone edge graphic and the air walls shown in FIG. 1.

Referring now to FIG. 1, the air wall 12 is shown. The air 12 may be a movable wall 12 that is commonly used in convention halls and large rooms. The air wall 12 may have a thin fabric layer 16 which forms the front surface 22 of the air wall 12. The silicone edge graphic 10 may be magnetically mounted to the wall's front surface 22 which is vertical to the ground. The magnets 18 are shown as being embedded in the frame members in FIG. 2. Moreover, the mounting of the silicone edge graphic 10 does not damage the fabric 16 of the air wall 12 because the back surface 14 (see FIG. 6) of the silicone edge graphic 10 is smooth and non-marring. Optionally, lateral edges 38, 40 (see FIG. 7) of the back surface 14 may also be filleted (i.e., radius) to prevent or mitigate damage to the front surface 22 of the wall 12. Also, no mechanical fastener is used that would penetrate the fabric 16 or any portion of the air wall 12. The silicone edge graphic 10 may be mounted to the air wall 12 solely by the magnets 18. The air wall 12 may also have an underlying metallic base 24 (see FIG. 6) to which the magnets 18 are attracted to in order to attach the silicone edge graphic 10 to the air wall 12.

The various aspects and embodiments described herein related to a silicone edge graphic 10. However, it is also contemplated that the various aspects and embodiments may be employed in other types of large format graphics which may incorporate the various aspects and embodiment described herein in order to magnetically mount the large format graphic to the wall. By way of example and not limitation, other large format graphics include and are not limited to fabric, vinyl, and paper. Moreover, the various aspects and embodiments described herein relate to an air wall that is typically used in a convention hall. However, other types of walls are also contemplated, including but not limited to any type of wall that is typically used in a convention hall setting or other types of walls used in a large room setting. The silicone edge graphic may be a large format graphic greater than two feet by four feet, and may be up to 50 feet by 50 feet in size.

Silicone edge graphic 10 may be fabricated from a plurality of frame members 20. The silicone edge graphic 10 shown in FIG. 1 has a rectangular configuration. The rectangular configured silicone edge graphic 10 may have four frame members 20 which are connected end to end. Each of the frame members 20 may be elongate and straight. Two immediately adjacent frame members 20 may be at a 90 degree to each other. Opposing sides may have frame members 20 of equal length and be oriented parallel to each other. Although the silicone edge graphic 10 shown in FIG. 1 has a rectangular configuration, other configurations are also contemplated such as triangular, star shaped, etc. The frame members 20 may be attached end to end to form such shapes.

The graphic may be printed on fabric 26. The fabric may have silicone 28 embedded or sown to the edges of the fabric 26 which are pushed into a slot 30 (see FIGS. 6 and 7) of the frame member 20. The silicone edge graphic 10 may be lightweight so that the silicone edge graphic 10 can be magnetically mounted to the wall 12. In other words, the magnetic force, generated by the magnets 18 in the silicone edge graphic 10 may be sufficiently strong to hold up the weight of the silicone edge graphic 10 on the wall 12.

Figure 7:
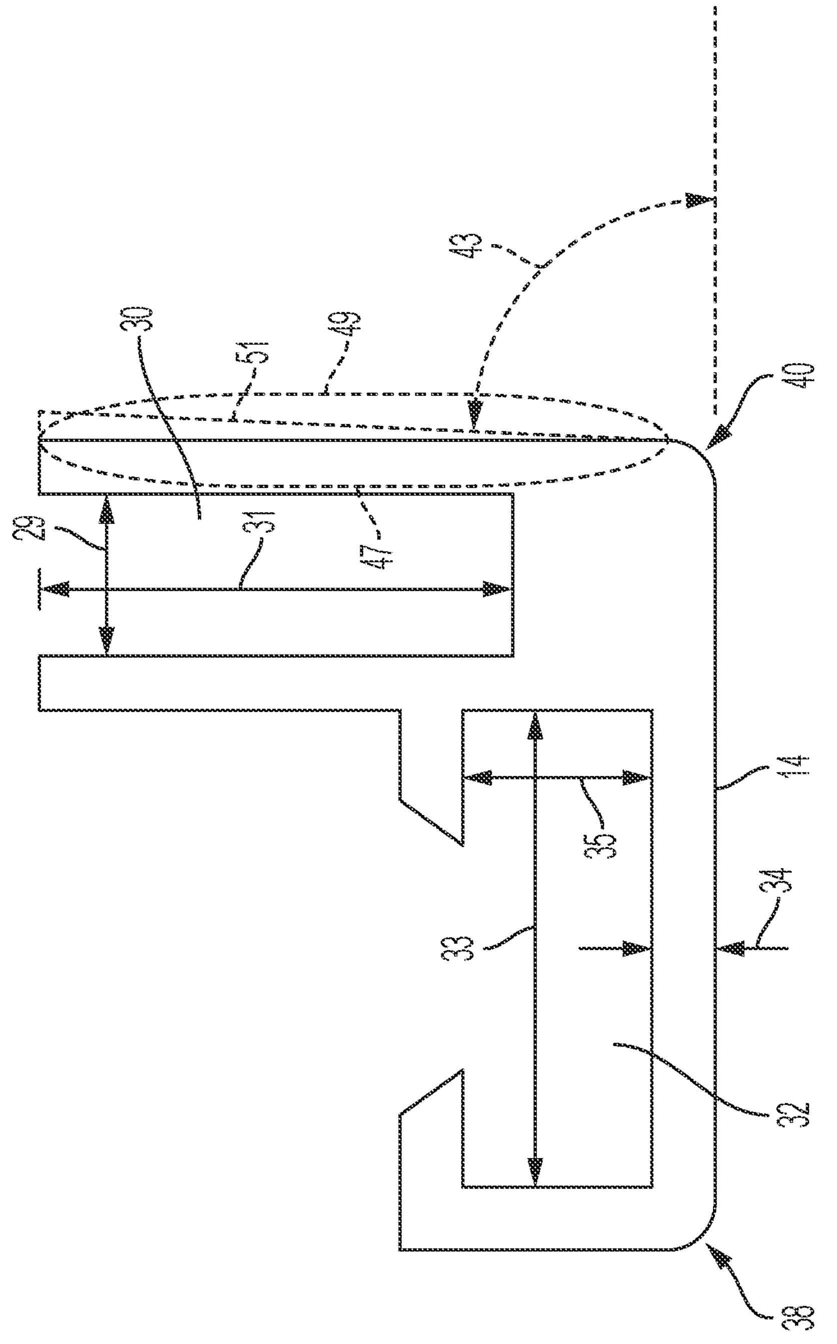
FIG. 7 is a cross-sectional view of the frame member shown in FIG. 6.
Figure 7A:
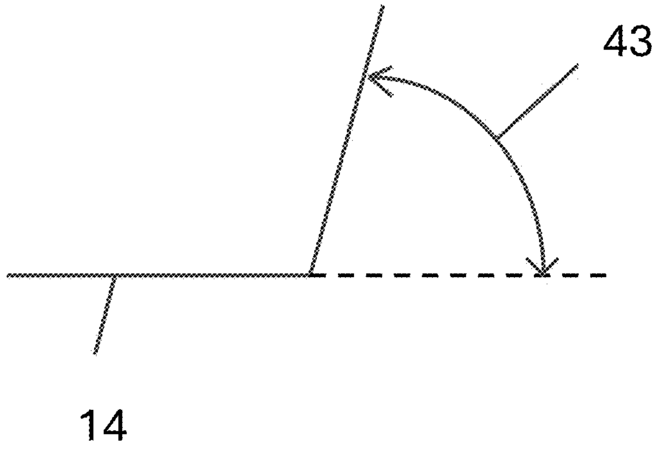
FIG. 7A illustrates an acute angle.

The frame members 20, which is shown in FIGS. 6 and 7 may have a slot or channel 30 which receives a bead 28 of silicone. The channel 30 may define a height 31 and a width 29. The fabric 26 on which the indicia is printed on may be stretchable. When the frame numbers 20 are attached to each other and the bead 28 of silicone is inserted into the channel 30, the fabric may be slightly stretched out so that the viewer sees a flat piece of fabric 26 with the printed indicia on it. The frame members 20 may also have a horizontal slot 32. This horizontal slot 32 may define a height 33 and a width 35. The height direction 33 may be parallel to the front surface 22 of the wall 12 when the silicone edge graphic 10 is mounted to the wall 12. In other words, the height direction 33 may be parallel to the back surface 14 of the frame member so that the magnet 18 when inserted into the slot 32 extends the magnetic field of the magnet 18 towards the magnetic backing of the wall so that the magnet 18 and the silicone edge graphic attaches to the wall. Moreover, the height direction 31 of the channel 30 may be perpendicular to the height direction 33 of the slot 32. The slot 32 may be sufficiently big to receive the magnet 18 therein. Preferably, the magnet 18 may snuggly fit and also slide within the slot 32 along a length of the frame members 20 in the slot 32. The magnet 18 may fit within the slot 32 so that the magnetic field of the magnet 18 extends behind the back surface 14 of the frame member 20. A thickness 34 of a backing portion is sufficiently small so the magnetic field of the magnet 18 attracts the metallic backing 24 of the air wall 12 toward the magnet to mount the silicone edge graphic 10 to the wall 12.

Parallel shall mean that the two planes, references lines, surfaces, or things being referenced is within + or −15 degrees from true parallel. The same is true for perpendicular. Perpendicular shall mean that the two planes, reference lines, surfaces, or things being referenced is + or −15 degrees from true perpendicular or 90 degree angle. Moreover, any angles referenced herein shall mean such angle + or −15 degrees.

The back surface 14 of the frame number 20 may be smooth so that the frame number 20 does not mar, rip or damage the fabric of the wall 12. Optionally, a felt material may be adhered to the back surface 14 so that when the silicone edge graphic 10 is mounted to the wall 12, the felt material contacts the front surface 22 of the wall 12 and does not mar or damage or rip the front surface 22 of the wall 12. The frame numbers 20 may define inner and outer edge portions 38, 40, as shown in FIGS. 6-6B. The inner and outer edges 38, 40 of the frame number 20 may optionally have a radius, which may further help to prevent any damage to the fabric 16 of the wall 12. The radius may be about 0.125 inches or more.

The frame members 20 may have a length of three feet or more and be fabricated from an aluminum or extruded aluminum material. Preferably, a transverse thickness of any part of the aluminum may be sufficiently thin (e.g., less than ¼ inch) so that the frame number 20 may bend along its length to help with the lifting of a corner of the silicone edge graphic 10 from the wall 12 when removing the silicone edge graphic 10 from the wall.

The magnets 18 may be positioned within the channel 32 of the frame number 20. The magnets 18 may be positioned every six inches to one foot away from each other. It is also contemplated that the magnets 18 may be disposed closer to each other so that they 18 are touching each other. The magnets 18 may be positioned away from a distal end of the frame member 20. By way of example and not limitation, a distal six inches to twelve inches of the frame number 20 may be void of any magnet 18. In this regard, the corner of silicone edge graphic 10 is easier to lift up. The user can lift up the corner or the area of the silicone edge graphic 10 where no magnet 18 is located to begin peeling the silicone edge graphic 10 off of the wall.

To further facilitate removal of the silicon edge graphic 10 off of the wall 12, and more particularly to facilitate peeling of the silicon edge graphic 10 off of the wall 12, an exterior surface 42 of the frame number may be roughened. This increases a coefficient of friction to help the user lift the frame member 20 off of the wall at the roughened surface. The user may push against the roughened area of the exterior surface 42 and lift upward in the direction of arrow 44. Moreover, the roughened area may be located where the frame number 20 is void of any magnet 18. If more lifting force is required, the user may also place his or her fingernail under the radius of the outer edge 40 which may further help the user peel the silicon edge graphic 10 off of the wall 12.

Figure 7B:
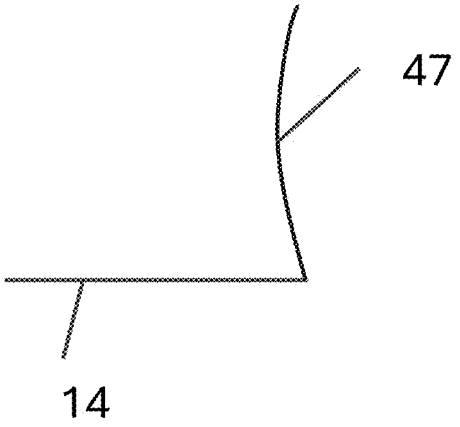
FIG. 7B illustrates a concave surface.
Figure 7C:
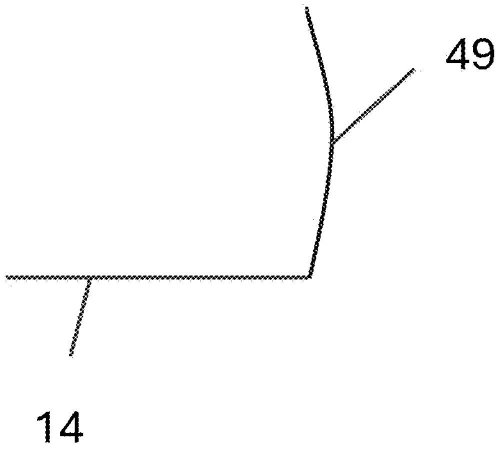
FIG. 7C illustrates a convex surface.

The exterior surface 42 of the frame member 20 may have other surface irregularities to assist the user in lifting the frame member 20 off of the wall. By way of example and not limitation, the exterior surface 42 may have a convex configuration (see FIG. 7C) along the length of the frame member 20 so that the user can push his or her finger 45 under the convex configured surface to lift up on the frame member 20. The exterior surface 42 may have a concave configuration (see FIG. 7B) along the length of the frame member 20 so that user can push his or her finger 45 into the concave surface to lift up on the exterior surface 42 of the frame member 20. Other configurations of the roughened area are also contemplated. By way of example and not limitation, the exterior surface 42 may have a decorative surface texture including but not limited to dimpled surface, diamond shaped surface, bumpy surface, sanded surface, smooth surface, texture similar to wood, plastic or aluminum. It is also contemplated that the exterior surface 42 may have an acute angle 43 (See FIG. 7) to the front surface 22 (see FIG. 7). In this manner, the acute angle may be about 85 to 75 degrees and provides for an indiscrete lip so that the user's finger 45 can lift up on the angled exterior surface 42.

Figure 4:
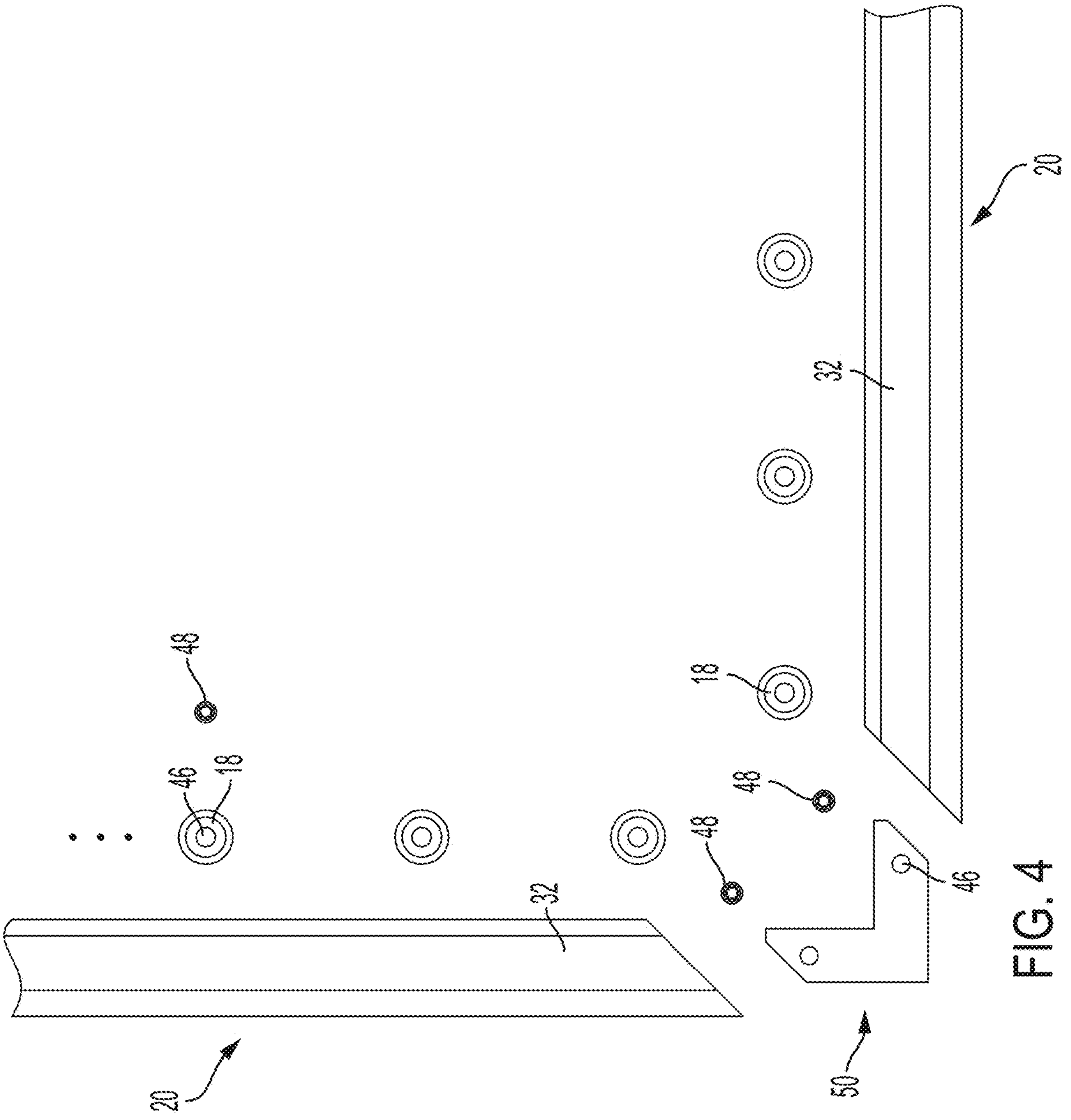
FIG. 4 is an exploded view of a frame of the silicone edge graphic shown in FIG. 3.

Referring now to FIG. 4, to assemble the silicone edge graphic 10, the user may initially insert (see FIG. 5) the magnets 18 into the channel 32. The magnets 18 may have a threaded through hole 46 which may receive a set screw. Once the magnets 18 are disposed within the channel 32, the user may set the location of the magnet 18 by tightening the set screw 48.

Figure 3:
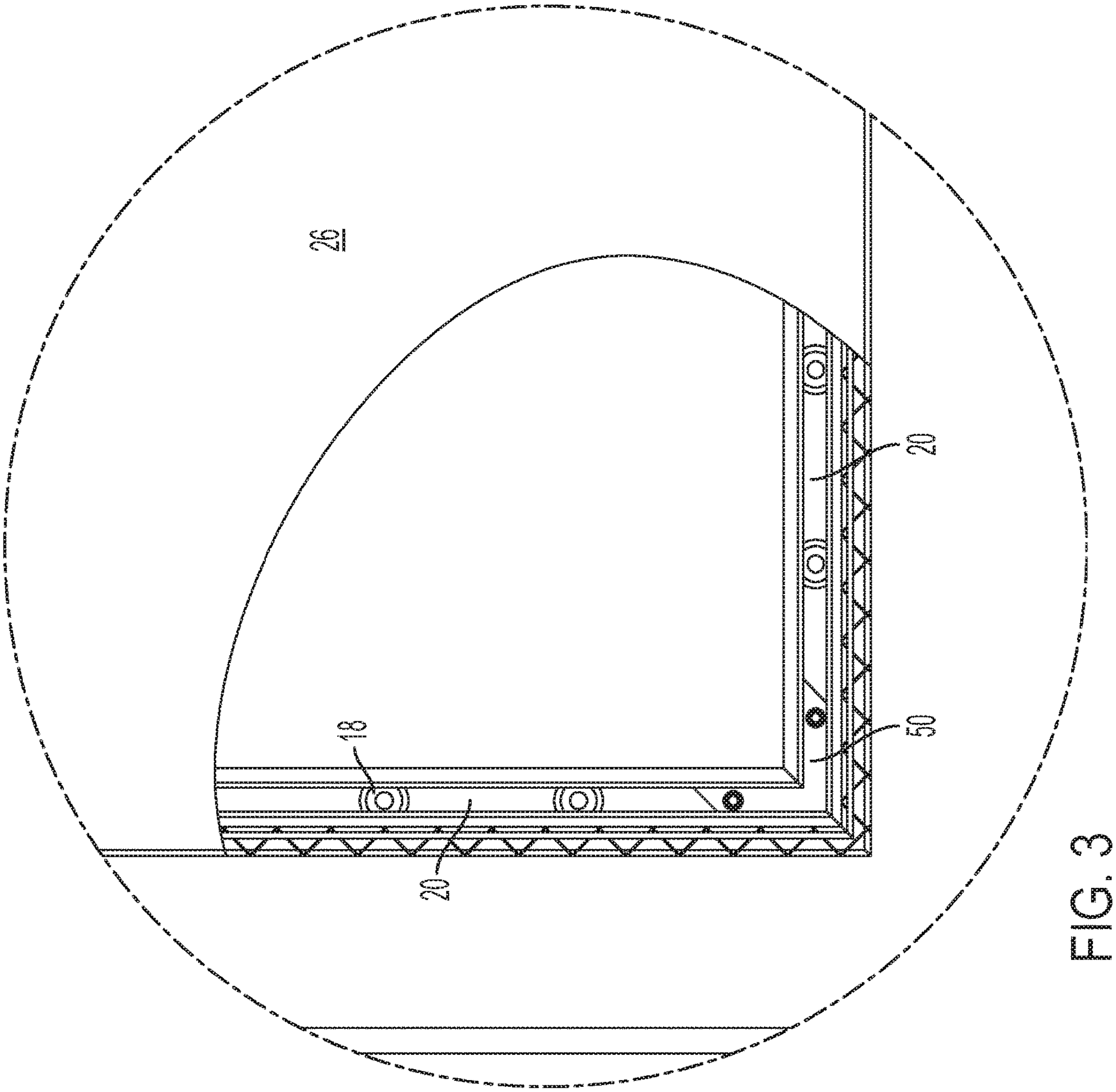
FIG. 3 is an enlarged, cut-away view of a portion of the silicone edge graphic shown in FIG. 2.

Brackets 50 may be received into adjacent frame members 20, as shown in FIGS. 3 and 4. Set screws may be inserted into threaded through holes 46 of the bracket 50 to connect the adjacent frame members 20 to each other. Once the frame members 20 are secured to each other, the fabric with indicia printed thereon may be attached to the frame members by inserting the bead 28 of silicone into the slot 30 of the frame member 20, as shown in FIG. 6.

After assembly of the silicone edge graphic 10, the user may mount the silicone edge graphic 10 to the wall 12 by placing the silicone edge graphic 10 near the wall 12. The magnetic field of the magnets 18 are attracted to the metal backing in the wall 12. The magnetic attraction mounts the silicon edge graphic 10 to the wall 12. No holes or any penetrations are made into the wall 12 to mount the silicon edge graphic 10 to the wall 12. Moreover, all surfaces of the silicon edge graphic 10 that contact the wall 12 are smooth and do not mar, rip or otherwise damage the air wall 12 or the fabric thereon.

To remove the silicon edge graphic 10 off of the wall 12, the user may peel the silicon edge graphic 10 off of the wall 12. In particular the user may press against the exterior surface 42 of the frame member 20. Preferably, no magnets are disposed in that area to help facilitate lifting the frame member 20 in that area to peel the silicon edge graphic 10 off of the wall 12.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A silicon edge graphic mountable to a wall without damaging a front surface of the wall, the silicon edge graphic comprising:

a plurality of extruded frame members having a first slot and a second slot, the first and second slots extending through an entire length of the frame member, the entire length of each of the frame members being greater than 2 feet;

a plurality of magnets disposed within the second slot of at least one frame member;

a plurality of angled brackets, each bracket insertable into the second slots of immediately adjacent frame members for connecting the immediately adjacent frame members to each other at an angle of the bracket;

a fabric with indicia printed thereon, an outer peripheral portion of the fabric having a shape coinciding with the plurality of frame members, an edge portion of the fabric having silicon attached thereto, the silicon disposed within the first slots of the frame members; and set screws threaded into threaded holes of the magnets for locking a position of the magnet within the second slots and along the length of the frame member.

2. The silicon edge graphic of claim 1 wherein the magnets are spread apart about 1 inch to 12 inches from each other.

3. The silicone edge graphic of claim 1 wherein a distal six inches of the frame members are devoid of any magnet.

4. The silicone edge graphic of claim 1 wherein the magnets are disposed in an upper most frame member of the plurality of frame members.

5. The silicone edge graphic of claim 1 wherein inner and outer edges of a back surface of the frame members having a radius greater than 1⁄16 of an inch.

6. The silicone edge graphic of claim 1 further comprising a felt material attached to a back surface of the frame member.

7. The silicone edge graphic of claim 1 wherein a frame member has a thickness of about 1 inch.

8. The silicon edge graphic of claim 1 wherein the magnets are spread apart about 1 inch to 12 inches from each other for at least 50% of the frame members.

9. The silicone edge graphic of claim 1 wherein a distal six inches of the frame members are devoid of any magnet.

10. A silicon edge graphic mountable to a wall without damaging a front surface of the wall, the silicon edge graphic comprising:

a plurality of extruded frame members having a first slot and a second slot, the first and second slots extending through an entire length of the frame member, the entire length of each of the frame members being greater than 2 feet;

a plurality of magnets disposed within the second slot of at least one frame member;

a plurality of angled brackets, each bracket insertable into the second slots of immediately adjacent frame members for connecting the immediately adjacent frame members to each other at an angle of the bracket; and a fabric with indicia printed thereon, an outer peripheral portion of the fabric having a shape coinciding with the plurality of frame members, an edge portion of the fabric having silicon attached thereto, the silicon disposed within the first slots of the frame members;

wherein an exterior side surface of the frame member has a roughened surface for assisting a user to lift up on the frame member to remove the silicone edge graphic from the wall.

11. The silicone edge graphic of claim 10 wherein inner and outer edges of a back surface of the frame members have a radius greater than 1⁄16 of an inch.

12. The silicone edge graphic of claim 10 further comprising a felt material attached to a back surface of the frame member.

13. A silicone edge graphic mountable to a wall without damaging a front surface of the wall, the silicon edge graphic comprising:

a plurality of extruded frame members having a first slot and a second slot, the first and second slots extending through an entire length of the frame member, the entire length of each of the frame members being greater than 2 feet;

a plurality of magnets disposed within the second slot of at least one frame member;

a plurality of angled brackets, each bracket insertable into the second slots of immediately adjacent frame members for connecting the immediately adjacent frame members to each other at an angle of the bracket; and a fabric with indicia printed thereon, an outer peripheral portion of the fabric having a shape coinciding with the plurality of frame members, an edge portion of the fabric having silicon attached thereto, the silicon disposed within the first slots of the frame members;

wherein an exterior side surface of the frame member has a convex or concave configuration along its length.

14. A silicone edge graphic mountable to a wall without damaging a front surface of the wall, the silicon edge graphic comprising:

a plurality of extruded frame members having a first slot and a second slot, the first and second slots extending through an entire length of the frame member, the entire length of each of the frame members being greater than 2 feet;

a plurality of magnets disposed within the second slot of at least one frame member;

a plurality of angled brackets, each bracket insertable into the second slots of immediately adjacent frame members for connecting the immediately adjacent frame members to each other at an angle of the bracket; and a fabric with indicia printed thereon, an outer peripheral portion of the fabric having a shape coinciding with the plurality of frame members, an edge portion of the fabric having silicon attached thereto, the silicon disposed within the first slots of the frame members;

wherein an exterior side surface of the frame member has an acute angle with respect to a plane of a back surface of the frame member.

15. A method of removing a silicone edge graphic from a wall, the method comprising the steps of:

providing a silicone edge graphic attached to the wall with a magnet;

pushing against an exterior surface of a frame member of the silicone edge graphic, and wherein the pushing step is performed at a distal six inches of the frame member where the frame member is devoid of any magnet;

lifting the frame member;

peeling the silicone edge graphic off of the wall.

* * * * *